United States Patent [19]

Billheimer

[11] Patent Number: 4,967,730
[45] Date of Patent: Nov. 6, 1990

[54] CONSTANT ABSORPTION SOLAR FURNACE

[75] Inventor: James C. Billheimer, Nashville, Ind.

[73] Assignee: Ventus, Inc., Helmsburg, Ind.

[21] Appl. No.: 437,108

[22] Filed: Nov. 16, 1989

[51] Int. Cl.$^5$ .................................................. F24J 2/10
[52] U.S. Cl. ..................................................... 126/438
[58] Field of Search .............. 126/424, 425, 438, 439, 126/440, 451, 448, 450; 350/628, 630, 629, 632

[56] References Cited

U.S. PATENT DOCUMENTS

| | | | |
|---|---|---|---|
| 4,011,858 | 3/1977 | Hurkett | 126/438 |
| 4,098,264 | 7/1978 | Brokaw | 126/425 |
| 4,241,726 | 12/1980 | Doebel | 126/438 |
| 4,291,679 | 9/1981 | Kersavage | 126/438 |
| 4,427,838 | 1/1984 | Goldman | 126/438 |
| 4,516,018 | 5/1985 | Bodenheimer et al. | 126/425 |
| 4,567,879 | 2/1986 | Clegg | 126/440 |

*Primary Examiner*—James C. Yeung
*Attorney, Agent, or Firm*—Barnes & Thornburg

[57] ABSTRACT

A radiant energy concentrator is provided for heating a fluid and includes a solar reflector for concentrating an increasing flux of radiant energy against a conduit containing a heat-absorbing fluid so that the rate of absorption of heat energy by the fluid is constant.

5 Claims, 1 Drawing Sheet

U.S. Patent    Nov. 6, 1990    4,967,730
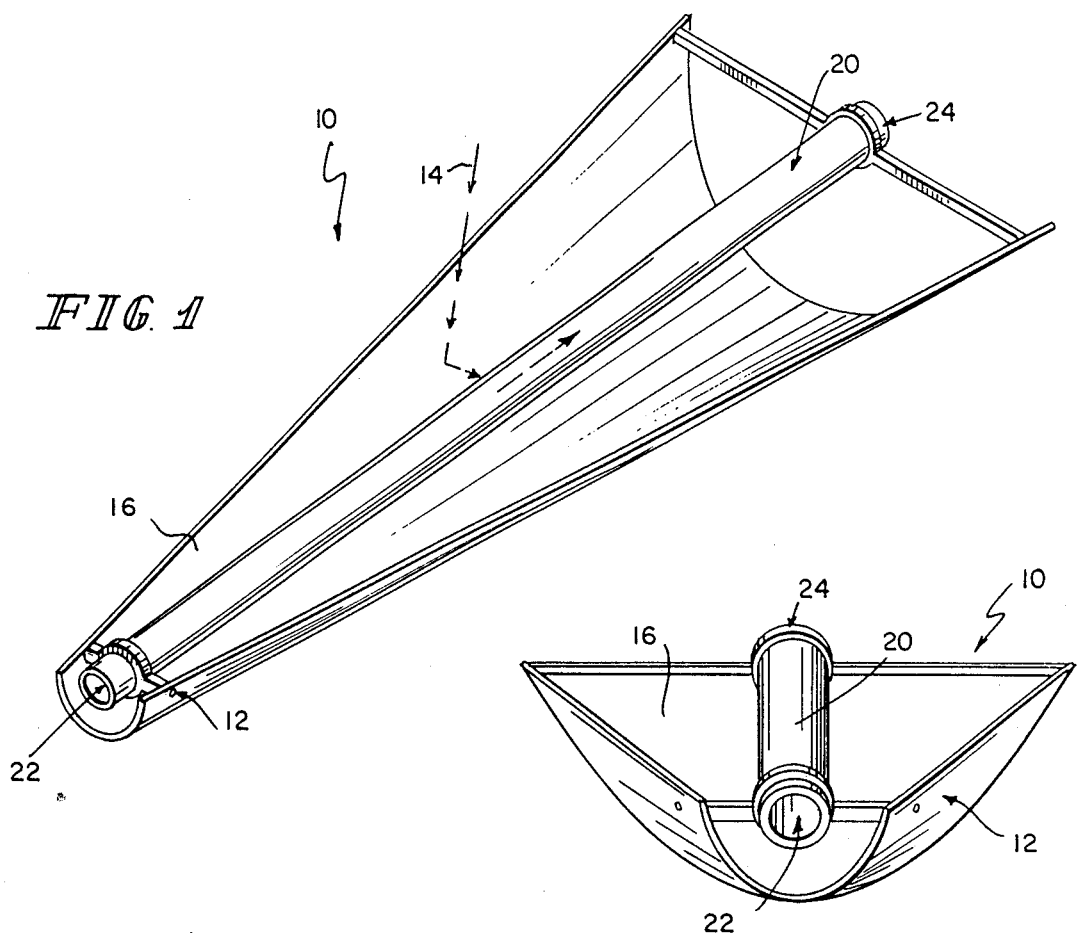
FIG. 1
FIG. 2
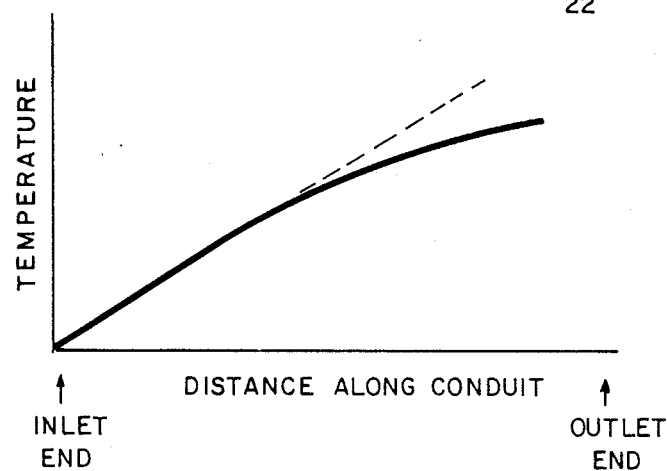
FIG. 3

CONSTANT ABSORPTION SOLAR FURNACE

FIELD OF THE INVENTION

This invention relates to radiant energy concentrators for heating a fluid and is more particularly concerned with solar reflectors for concentrating an increasing flux of radiant energy against a conduit containing a heat-absorbing fluid so that the rate of absorption of heat energy by the fluid is constant.

BACKGROUND AND SUMMARY OF THE INVENTION

Radiant energy concentrators that receive or produce radiant energy over a wide area and concentrate the radiant energy upon a smaller absorptive surface are widely used for heating or the production of photoelectricity. Concentration of radiant energy derived from the sun can be achieved using curved reflecting surfaces, lenses, flat reflecting surfaces, or various types of non-focusing refractive concentrators well known in the art. Typically, the concentrated solar energy is directed against a heat-absorbing surface or a photovoltaic cell, which respectively converts the concentrated radiant energy into heat or electricity.

Converting radiant energy into thermal energy that can be used for space heating, driving heat engines, or for drying or heating objects can be realized by directing concentrated radiant energy against a heat absorptive element or conduit that contains a fluid. The concentrated radiant energy is converted into heat contained by the fluid either by direct radiant transfer of heat energy to the fluid or indirectly, by radiant transfer to a absorbing element followed by transfer of the heat from the absorbing element to the fluid through conduction or other means. The amount of heat transferred from a radiating surface to an absorbing element is determined by the Stefan-Boltzmann law:

$$Q = cA(T_1^4 - T_2^4)$$

where Q is the amount of heat transferred per unit time, c is a constant that corresponds to adjustments for the shapes of the bodies, thermal radiation characteristics, and properties of the intervening media through which radiation passes from the radiating to the receiving body, A is the area of the radiating surface, $T_1$ is the temperature (absolute) of the radiating body and $T_2$ is the temperature (absolute) of the receiving body. Since radiant heat transfer is a function of the difference in temperature between the radiating body and the absorbing body, an increase in the temperature of the absorbing body results in a decrease in the rate of heat transfer when all other variables are kept constant.

The decrease in rate of heat transfer is also encountered when the temperature of the fluid increases relative to the absorbing element that is heated by concentrated radiation. The rate of convective heat transfer is conveniently described by Newtons equation:

$$q = h(T_1 - T_2)$$

where q is the amount of heat transferred per unit time, h is a heat transfer coefficient that is generally empirically found, $T_1$ is the temperature of the absorbing element, and $T_2$ is the temperature of the fluid. For smooth laminar flow of a fluid over an absorbing element, this means that the rate of heat transfer is generally proportional to the temperature difference. If the temperature of the absorbing element remains constant, the rate of heat transfer is expected to diminish as the fluid is heated.

Typical devices for converting radiant energy derived from the sun into heat contained by an absorbing fluid are discussed in U.S. Pat. No. 4,011,858 to Hurkett and U.S. Pat. No. 4,427,838 to Goldman, both herein incorporated by reference. Both Hurkett '858 and Goldman '838 describe an apparatus for collecting solar energy that includes a parabola shaped reflector situated around a pipe enclosed in a glass tube. The pipe is located at the focal point of the generally trough shaped reflector. Solar radiation incident parallel to the reflector is focused upon the pipe, heating water that is introduced into the pipe. Since the cross section of the reflecting surface of the trough shaped reflector is unchanged for the length of the trough shaped reflector, a constant flux of reflected solar radiation is directed against the pipe at all points along that length. This results in a continuously decreasing rate of heat absorption as the fluid travels along the pipe, since the efficiency of heat absorption of fluids or other objects diminishes as their temperatures rise.

Radiant energy concentrators are not restricted only to those devices that reflect incident solar energy to a predetermined focus. Heated surfaces will radiate infrared radiation that can be used to heat or dry selected fluids or objects. For example, heat energy can be transferred to a radiating surface by convective, contact, or radiative heating to be radiatively concentrated and transferred to the object or fluid. Transfer of heat to a radiating surface for the purpose of drying coated objects is found in Best U.S. Pat. No. 4,546,553 in which opposed curved walls direct infrared radiant heat against painted objects passed through an oven chamber. The walls of the oven chamber are heated by directing turbulent air against the inside surfaces of the curved wall, causing the curved walls to radiate infrared heat that is focused at the center of the oven chamber, and thereby heating objects transported along the centerline of the container. Since the cross section and amount of radiating wall surface does not vary, objects entering the oven chamber receive a constant amount of infrared radiation during their passage through the oven chamber.

It is therefore an object of the present invention to provide a radiant energy concentrating apparatus for concentrating a gradually increasing flux of radiant energy against a fluid passing through a radiant energy concentration apparatus.

It is another object of this invention to provide a means for keeping the rate of heat absorption of a fluid passing through a device for concentrating energy constant or generally increasing.

Still another object of the invention is to provide a trough shaped solar reflector having a parabolic cross section that focuses upon a pipe carrying a fluid so that the flux of concentrated solar radiation increases along the pipe in the direction of fluid flow.

Yet another object of this invention is to provide a radiating surface configured to concentrate radiant energy on an object transported along the focus of the radiating surface, with the radiating surface shaped to concentrate an increasing radiation flux against the object in the direction of object transport so that the rate of heat absorption by the object is constant or generally increasing.

Still another object of this invention is to provide a radiating surface configured to concentrate radiant energy on an object transported along the focus of the radiating surface, with the radiating surface shaped to concentrate a decreasing radiation flux against the object in the direction of object transport so that the rate of heat absorption by the object decreases.

The present invention is a radiant energy concentrating apparatus that includes a conduit for transporting a substance. The conduit has a first portion and a second portion situated contiguous to each other. A radiant energy concentrator directs a flux of radiant energy against the conduit so that the first portion of the conduit receives a lesser flux of radiant energy as compared to the second portion of the conduit.

In preferred embodiments the radiant energy concentrator has an at least one mirrored surface for reflecting and concentrating incident solar radiation upon the conduit, which has an inlet end for introducing a fluid and an outlet end for discharging a fluid. A generally trough shaped mirror having a parabolic cross section will focus incoming solar radiation travelling in parallel paths to a central parabolic focus that extends in a line centered in the trough. The conduit is situated along the parabolic focal line of the generally trough shaped mirror so that the concentrated solar radiation is absorbed by a fluid introduced through the inlet end into the conduit. To keep the rate of heat absorption constant or increasing as the temperature of the fluid rises as a consequence of absorbing heat energy derived from the solar radiation, the effective surface area of the mirror surface is increased in the direction of fluid flow, which is from the inlet end toward the outlet end. Consequently, the flux of solar radiation concentrated upon the conduit is increased toward the outlet end to compensate for the reduction of heat absorptive efficiency of the fluid as the fluid is heated by concentrated solar radiation as it flows through the conduit.

Reversal of the direction of fluid flow is also possible with the apparatus of the present invention. If it is desirable to encourage a decreasing rate of heat absorption, fluid can be introduced into a conduit and flow in the direction of decreasing radiative flux. Reversal of fluid flow direction, so that the former inlet is now an outlet, and the outlet is now an inlet, is a contemplated method for enabling a decreasing rate of heat absorption.

The present invention is not limited to radiant energy concentrators that reflect incident solar radiation. In other preferred embodiments a radiating oven having radiating surfaces formed as spherical sections for heating objects or fluids conveyed through the radiant oven is also contemplated. The effective area of the spherical sections, heated to radiate infrared energy that is concentrated at the center of the spherical section, can be increased in the direction of object or fluid conveyance so that the rate of heat absorption by the object or fluid remains constant or increasing.

An advantageous feature of the present invention is the ability of the claimed apparatus to maintain a constant rate of heat absorption by an object or fluid heated by the device even though the efficiency of radiative heat absorption declines as the absolute temperature difference between the radiating source and the heated object or fluid decreases.

Another advantageous feature of the present invention is the ability of the claimed apparatus to maintain an increasing rate of heat absorption by an object or fluid heated by the device even though the efficiency of radiative heat absorption declines as the absolute temperature difference between the radiating source and the heated object or fluid decreases.

These and other objects, advantages and features will become more apparent with reference to the following detailed description and accompanying drawings.

BRIEF DESCRIPTION OF THE DRAWINGS

FIG. 1 is a perspective view of a generally trough shaped mirror having a parabolic cross section and an effective reflecting area greater toward the outlet end of a conduit than the inlet end of the conduit in the manner of the present invention;

FIG. 2 is an end elevation view of the apparatus shown in FIG. 1, illustrating the position of the conduit at the focus of trough shaped mirror having a parabolic cross section; and FIG. 3 is a temperature/distance graph (not to scale) qualitatively demonstrating the drop in heat absorption of a fluid traveling through the conduit of the apparatus shown in FIGS. 1 and 2.

DETAILED DESCRIPTION OF THE DRAWINGS

With reference to FIGS. 1 and 2 a preferred embodiment of the present invention is illustrated as a solar radiation collector 10, including a solar radiation concentrator 12 for collecting and concentrating solar rays 14 and a conduit 20 having inlet end 22 and outlet end 24.

The solar radiation concentrator 12 has a reflective coating 16 capable of reflecting solar rays 14 incident upon the concentrator 12. The solar rays 14 are focused upon the conduit 20, and are converted by radiative absorption into heat energy that can be conductively transferred to a liquid (not shown) that will flow through the tube during operation of the solar radiation collector 10.

In operative use, a liquid enters the inlet end 22 of the conduit 20 and is heated from its initial temperature by heat conducted by the conduit 20, which heat is in turn derived from radiative heat absorption of solar rays 14 emitted by the sun (not shown) and reflected by the reflective coating 16 on the surface of the concentrator 12 to impinge upon the conduit 20. The solar radiation concentrator 12 is configured so that the flux of solar rays 14 incident upon the conduit 20 increases from the inlet end 22 toward the outlet end 24.

The apparatus shown in FIGS. 1 and 2 will also act to concentrate an increasing flux of radiation against the conduit 20 if the radiation concentrator 12 is heated to emit thermal radiation. By eliminating the reflective coating 16 and heating the radiation concentrator 10, fluids passing through the conduit 20 will receive a greater amount of radiated (rather than reflected) thermal radiation so that the rate of heat absorption can be maintained at a constant or increasing rate.

The graph shown in FIG. 3 is qualitative, and meant to show the difference in heat absorption between a solar energy collector 10 with an increasing reflecting area focused along the length of the conduit 20 and a solar energy collector having a constant reflecting area along the length of a conduit (not shown). Fluid entering the inlet end 22 of both types of collector will initially have the same temperature. As heat energy is radiatively absorbed by the conduit and transferred by conduction to the fluid, the temperature of the fluid in both devices will rise at equivalent rates, with the fluid temperature rising at a constant rate as it flows along the conduit toward the outlet end 24. However, as the temperature continues to rise, the rate of radiative absorption per unit time is slowed. This slowing is compensated for in the present invention by increasing the area for reflecting solar rays 14 against the conduit 20, so that the rate of heat absorption remains constant and the rate at which the temperature rises (marked as the dotted line 30) also remains constant. Devices in which the flux of radiation is not increased as the temperature of the fluid rises will demonstrate a decreased rise in temperature as the fluid is heated as shown by line 32 in the graph.

It will be understood of course that various features and modifications of the present invention can be made by those skilled in the art without affecting the spirit or scope of the invention.

What is claimed is:

1. A radiant energy concentrating apparatus comprising,
    conduit means for transporting a fluid,
    a radiant energy concentrator means having a focal path to which it concentrates radiant energy,
    a portion of the conduit means being located coextensively with said focal path,
    said radiant energy concentrator means directing an increasing amount of flux of radiant energy against said portion of said conduit means so that said portion receives an increasing flux of radiant energy along its length, and
    wherein said increasing amount of flux causes the fluid to absorb a constant amount of heat as it is transported throughout the length of said portion of the conduit.

2. The apparatus of claim 1, wherein a fluid is introduced to flow through said portion of the conduit.

3. The apparatus of claim 2, wherein the portion of the conduit means has an inlet end through which the fluid is introduced and an outlet end through which the fluid is discharged,
    said conduit means transporting fluid between the inlet end and the outlet end, and
    wherein the radiant energy concentrator means is configured so that the flux of radiant energy directed against the portion of the conduit continuously increases from the inlet end of the portion of the conduit toward the outlet end of the portion of the conduit.

4. The apparatus of claim 3, wherein the radiant energy concentrator includes a generally trough shaped mirrored reflector having a parabolic cross section with increasing dimensions along its length.

5. The apparatus of claim 4, wherein the increase in dimensions of the parabolic cross section of the generally trough shaped mirrored reflector increases from the inlet end toward the outlet end of the portion of the conduit means so that a continuously increasing flux of radiant energy is directed against the portion of the conduit in the direction of fluid flow.

* * * * *